(12) United States Patent
Sagae et al.

(10) Patent No.: US 11,722,223 B2
(45) Date of Patent: Aug. 8, 2023

(54) OPTICAL COMMUNICATION SYSTEM AND OPTICAL COMMUNICATION METHOD

(71) Applicant: NIPPON TELEGRAPH AND TELEPHONE CORPORATION, Tokyo (JP)

(72) Inventors: Yuto Sagae, Musashino (JP); Takashi Matsui, Musashino (JP); Taiji Sakamoto, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/634,193

(22) PCT Filed: Aug. 19, 2019

(86) PCT No.: PCT/JP2019/032323
§ 371 (c)(1),
(2) Date: Feb. 9, 2022

(87) PCT Pub. No.: WO2021/033248
PCT Pub. Date: Feb. 25, 2021

(65) Prior Publication Data
US 2022/0294536 A1 Sep. 15, 2022

(51) Int. Cl.
*H04B 10/61* (2013.01)
*H04B 1/04* (2006.01)

(52) U.S. Cl.
CPC ......... *H04B 10/613* (2013.01); *H04B 1/0483* (2013.01); *H04B 10/61* (2013.01)

(58) Field of Classification Search
CPC . H04B 10/613; H04B 10/2507; H04B 10/616
USPC .......................................................... 398/161
See application file for complete search history.

(56) References Cited

U.S. PATENT DOCUMENTS 7,061,657 B1 * 6/2006 Fishman ................. H04J 14/02
398/79
7,796,068 B2 * 9/2010 Raz ...................... H03M 1/1033
341/120
9,531,472 B2 * 12/2016 Zhang ................ H04B 10/2507
(Continued)

OTHER PUBLICATIONS

Mark D. Feuer et al., "Joint Digital Signal Processing Receivers for Spatial Superchannels" IEEE, Oct. 2, 2012. (Year: 2012).*
(Continued)

*Primary Examiner* — Abbas H Alagheband
(74) *Attorney, Agent, or Firm* — Harness, Dickey & Pierce, P.L.C.

(57) ABSTRACT

An objective of the present invention is to provide an optical communication system and an optical communication method that can reduce even a delay generated in processing of obtaining a transfer function for correcting distortion in digital coherent transmission. In the optical communication system according to the present invention, pilot data for estimating a transfer function for a transmission channel is transmitted through a transmission channel with a short transmission delay time, a transfer function of the transmission channel is estimated before receiving transmission data, and the transfer function is applied to other transmission channels.

8 Claims, 5 Drawing Sheets

(56) References Cited

U.S. PATENT DOCUMENTS

| | | | |
|---|---|---|---|
| 2009/0214224 A1* | 8/2009 | Cho | H04B 10/61 398/188 |
| 2013/0071105 A1* | 3/2013 | Chang | H04J 14/02 398/43 |
| 2015/0288450 A1* | 10/2015 | Zhang | H04B 10/29 398/115 |
| 2016/0006532 A1* | 1/2016 | Chang | H04L 25/03891 398/79 |
| 2016/0119078 A1* | 4/2016 | Kakande | H04J 14/06 398/65 |
| 2017/0019178 A1* | 1/2017 | Alic | H04B 10/2543 |
| 2017/0149507 A1* | 5/2017 | Le Taillandier De Gabory | H04B 10/50595 |
| 2019/0379461 A1* | 12/2019 | Irie | H04B 10/572 |
| 2020/0343973 A1* | 10/2020 | Geisler | H04B 10/112 |

OTHER PUBLICATIONS

Roy G. H. van Uden et al., "28-GBd 32QAM FMF Transmission with Low Complexity Phase Estimators and Single DPLL" Feb. 10, 2014 (Year: 2014).*

Cheng Liu et al., "Joint Digital Signal Processing for Superchannel Coherent Optical Systems: Joint CD Compensation for Joint ICI Cancellation" 2012 (Year: 2012).*

Arni F. Alfredsson et al., "Joint Phase Tracking for Multicore Transmission with Correlated Phase Noise". Oct. 14, 2014 (Year: 2014).*

M. D. Feuer, L. E. Nelson, X. Zhou, S. L. Woodward, R. Isaac, B. Zhu, T. F. Taunay, M. Fishteyn, J. M. Fini and M. F. Yan, "Joint Digital Signal Processing Receivers for Spatial Superchannels", IEEE Photon. Technol. Lett. vol. 24, No. 21 (2012).

M. Hirano, Y. Yamamoto, V. A. M. Sleifffer and T. Sasaki, "Analytical OSNR Formulation Validate with 100G-WDM experiments and Optical Subsea Fiber Proposal", in proceedings of OFC2013, OTu2B.6(2013).

S. Zhang, P. Y. Kam, J. Chen, and C. Yu "Bit-error rate performance of coherent optical M-ary PSK/QAM using decision-aided maximum likelihood phase estimation", Optics Express, vol. 18, No. 12, p. 12088-12103 (2010).

T. Kodama, T. Miyazaki, and M. Hanawa "Seamless PAM-4 to QPSK Modulation Format Conversion at Gateway for Short-reach and Long-haul Integrated Networks", ECOC2018, pp. 1-3 (2018).

K. Kikuchi "Characterization of semiconductor-laser phase noise and estimation of bit-error rate performance with low-speed offline digital coherent receivers", Optics Express, vol. 20, No. 5, pp. 5291-5302 (2012).

B. J. Puttnam, G. Rademacher, R. S. Luis, J. Sakaguchi, Y. Awaji, N. Wada, "Inter-Core Skew Measurements in Temperature Controlled Multi-Core Fiber", in proceedings of OFC2018, Tu3B.3 (2018).

* cited by examiner

[3]

[4]

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2019/032323, filed on Aug. 19, 2019. The entire disclosures of the above applications are incorporated herein by reference.

TECHNICAL FIELD

The present disclosure relates to an optical communication system and an optical communication method for performing digital coherent transmission.

BACKGROUND ART

In recent years, there has been increasing demand for prevention of transmission delays with the diversification of network usage. In communication between computers such as highly frequent financial transactions based on algorithms, data is communicated and processed in units of nano-seconds (ns) to micro-seconds (µs), and thus even a slight reduction in a transmission delay causes a significant impact. It is expected that the demand for reduction in amounts of delay will accelerate further in the future.

In optical transmission systems, wavelength dispersion, polarization mode dispersion, frequency offsets, phase offsets, and other signal distortions caused by a light source or a transmission line limit the expansion of transmission capacities. Currently, a digital coherent transmission technique for correcting signal distortion through digital signal processing and an error correction technique for correcting a bit error caused by other random noise enable optical transmission with the high number of bits per symbol, and thus an exponential increase in transmission capacities has been achieved. Digital coherent transmission techniques and error correction techniques obtain equalized signals by estimating a signal distortion or a bit error caused by the transmission line from received signals.

Digital signal processing that imposes a high load is required for the expansion of a transmission band. A transmission band, and a load and a delay time in signal processing are in a trade-off relationship. Non Patent Literature 1 reports that a signal processing load is reduced by diverting correction of distortion caused by digital signal processing partially between channels.

CITATION LIST

Non Patent Literature

NPL 1: M. D. Feuer, L. E. Nelson, X. Zhou, S. L. Woodward, R. Isaac, B. Zhu, T. F. Taunay, M. Fishteyn, J. M. Fini and M. F. Yan, "Joint Digital Signal Processing Receivers for Spatial Superchannels", IEEE Photon. Technol. Lett. Vol. 24, No. 21 (2012).

NPL 2: M. Hirano, Y. Yamamoto, V. A. M. Sleifffer and T. Sasaki, "Analytical OSNR Formulation Validate with 100G-WDM experiments and Optical Subsea Fiber Proposal", in proceedings of OFC2013, OTu2B.6 (2013).

NPL 3: S. Zhang, P. Y. Kam, J. Chen, and C. Yu "Bit-error rate performance of coherent optical M-ary PSK/QAM using decision-aided maximum likelihood phase estimation", Optics Express, Vol. 18, No. 12, pp. 12088-12103 (2010).

NPL 4: T. Kodama, T. Miyazaki, and M. Hanawa "Seamless PAM-4 to QPSK Modulation Format Conversion at Gateway for Short-reach and Long-haul Integrated Networks", ECOC2018 pp. 1-3 (2018).

NPL 5: K. Kikuchi "Characterization of semiconductor-laser phase noise and estimation of bit-error rate performance with low-speed offline digital coherent receivers", Optics Express, Vol. 20, No. 5, pp. 5291-5302 (2012).

NPL 6: B. J. Puttnam, G. Rademacher, R. S. Luis, J. Sakaguchi, Y. Awaji, N. Wada, "Inter-Core Skew Measurements in Temperature Controlled Multi-Core Fiber", in proceedings of OFC2018, Tu3B.3 (2018).

SUMMARY OF THE INVENTION

Technical Problem

However, although a load of signal processing is reduced, Non Patent Literature 1 has a problem in that it is difficult to reduce a delay generated in processing of obtaining a transfer function for correcting distortion. Therefore, an objective of the present invention is to provide an optical communication system and an optical communication method that can reduce even a delay generated in processing of obtaining a transfer function for correcting distortion in digital coherent transmission.

Means for Solving the Problem

To achieve the objective, an optical communication system according to the present invention transmits pilot data for estimating a transfer function for a transmission channel through a transmission channel with a short transmission delay time, estimates a transfer function of the transmission channel before receiving transmission data, and applies the transfer function to other transmission channels.

Specifically, an optical communication system according to the present invention is an optical communication system configured to perform digital coherent transmission, the optical communication system including N (N is an integer of 2 or greater) transmission channels configured to transmit optical signals obtained by modulating light beams with pieces of transmission data, N receivers connected to the N transmission channels in a one-to-one manner and configured to receive the optical signals transmitted through the corresponding N transmission channels by performing coherent detection with single local oscillator light beam, a signal processing unit connected to a receiver of the N receivers connected to a shortest transmission channel, which is a transmission channel with a shortest transmission delay time among the N transmission channels, and configured to acquire a transfer function for removing signal distortion of an optical signal of the optical signals propagated through the shortest transmission channel, and N−1 demodulation units connected, in a one-to-one manner, to receivers of the N receivers connected, in a one-to-one manner, to other transmission channels which are other than the shortest transmission channel among the N transmission channels and configured to remove signal distortions of optical signals propagated through the corresponding other transmission channels by using the transfer function and demodulate the pieces of transmission data.

In addition, an optical communication method according to the present invention is an optical communication method for digital coherent transmission, the optical communication method including
transmitting optical signals through N (N is an integer of 2 or greater) transmission channels, receiving, with N receivers, the optical signals transmitted through the corresponding N transmission channels by performing coherent detection with single local oscillator light beam, acquiring a transfer function for removing signal distortion of an optical signal of the optical signals propagated through a shortest transmission channel that is a transmission channel with a shortest transmission delay time among the N transmission channels, and
removing signal distortions of optical signals propagated through other transmission channels other than the shortest transmission channel among the N transmission channels by using the transfer function.

The present optical communication system and the present optical communication method use a plurality of transmission channels with different signal transmission delay times, and acquire a transfer function for correcting signal distortion through the transmission channel having a short transmission delay time among the transmission channels prior to other transmission channels. In addition, the transfer function is used for estimating the signal distortion of other transmission channels. Because a transfer function is acquired for all transmission channels in digital coherent transmission of the related art, if a transfer function is acquired only for a particular transmission channel as in the present optical communication system and the present optical communication method, a signal processing load imposed on all of the transmission lines can be greatly reduced and at the same time, the signal processing time can be reduced when the transfer function is diverted to other channels.

The transmission data of the optical signal propagated through the shortest transmission channel is preferably pilot data with a shorter transmission delay time which is shorter than any transmission delay times of the transmission data among the pieces of the optical signals propagated through the other transmission channels.

The optical communication system according to the present invention further includes a single light source and N modulators configured to output optical signals obtained by modulating light beams output by the light source at an identical time with the corresponding pieces of transmission data. Transfer functions vary depending on frequency fluctuation and phase noise of the light source that generates signals. Thus, in order to divert the transfer function identified with the pilot data to demodulation of the transmission data, light generated from the one light source at the same time is preferably used for the pilot data signal and the transmission data signal.

The optical communication system and the optical communication method according to the present invention delay times when the local oscillator light beams output at an identical time arrive at the corresponding N receivers by a transmission delay time difference of the N transmission channels. The present optical communication system and the present optical communication method can perform demodulation without causing quality degradation regardless of a relationship between a transmission delay time difference and a transmission distance of transmission channels.

Effects of the Invention

The present invention can provide an optical communication system and an optical communication method that can reduce even a delay generated in processing of obtaining a transfer function for correcting distortion in digital coherent transmission.

DESCRIPTION OF EMBODIMENTS

Embodiments of the present invention will be described with reference to the accompanying drawings. The embodiments described below are examples of the present invention, and the present invention is not limited to the embodiments described below. Note that constituent components with the same reference signs in the specification and the drawings are assumed to be the same ones.

Embodiments of the invention will now be described with an N-channel transmission system as an example. N is a natural number of 2 or greater.

First Embodiment

Figure 1:
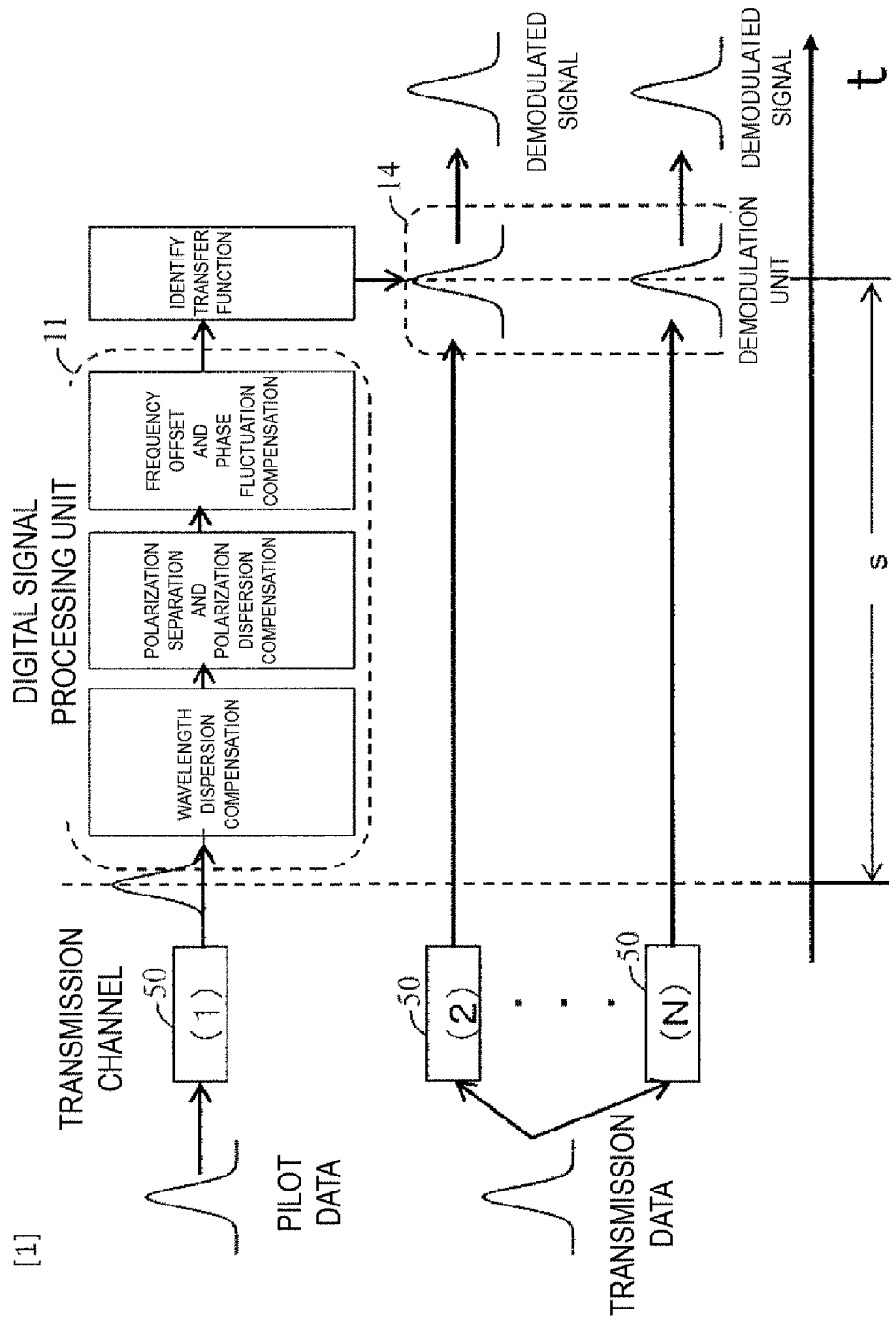
FIG. 1 is a diagram illustrating the principle of an optical communication method according to the present invention.

FIG. 1 illustrates a conceptual diagram of an optical communication method of the present embodiment. In coherent optical transmission, signal distortion generated on a transmission channel 50 is demodulated by digital signal processing. A digital signal processing unit 11 includes a wavelength dispersion compensation unit 11$a$, a polarization separation and polarization mode dispersion compensation unit 11$b$, and a frequency offset and phase fluctuation compensation unit 11$c$. The digital signal processing unit 11 identifies a transfer function for removing signal distortion by causing an optical signal to sequentially pass through the wavelength dispersion compensation unit 11$a$, the polarization separation and polarization mode dispersion compensation unit 11$b$, and the frequency offset and phase fluctuation compensation unit 11$c$. In digital coherent transmission of the related art, a transfer function is acquired for each transmission channel and a demodulation unit obtains a demodulated signal.

The optical communication method of the present embodiment simultaneously achieves a reduction in a signal processing load and a reduction in a signal processing delay using various transmission channels 50 with different signal delay times. A transmission channel 50 (1) has a transmission delay time that is shorter by s than those for the transmission channels 50 (2) to (N). The present optical communication method identifies a transfer function with a pilot signal having a shorter transmission delay time and diverts the transfer function to demodulation of data of the transmission channels 50 (2) to (N) that are received later.

Because digital signal processing on the transmission channels (2) to (N) is unnecessary in the present optical communication method, a signal processing load can be reduced to 1/N of that of the digital coherent transmission in the related art. In the example of FIG. 1, the transfer function for all of the functional blocks including the wavelength dispersion compensation unit 11$a$, the polarization separation and polarization mode dispersion compensation unit 11$b$, and the frequency offset and phase fluctuation compensation unit 11$c$ is diverted to transmission data of other transmission channels. In addition to the example of FIG. 1, the same effect can be obtained when only a transfer function of any one of functional blocks is acquired and diverted to other transmission data.

Second Embodiment

Figure 2:
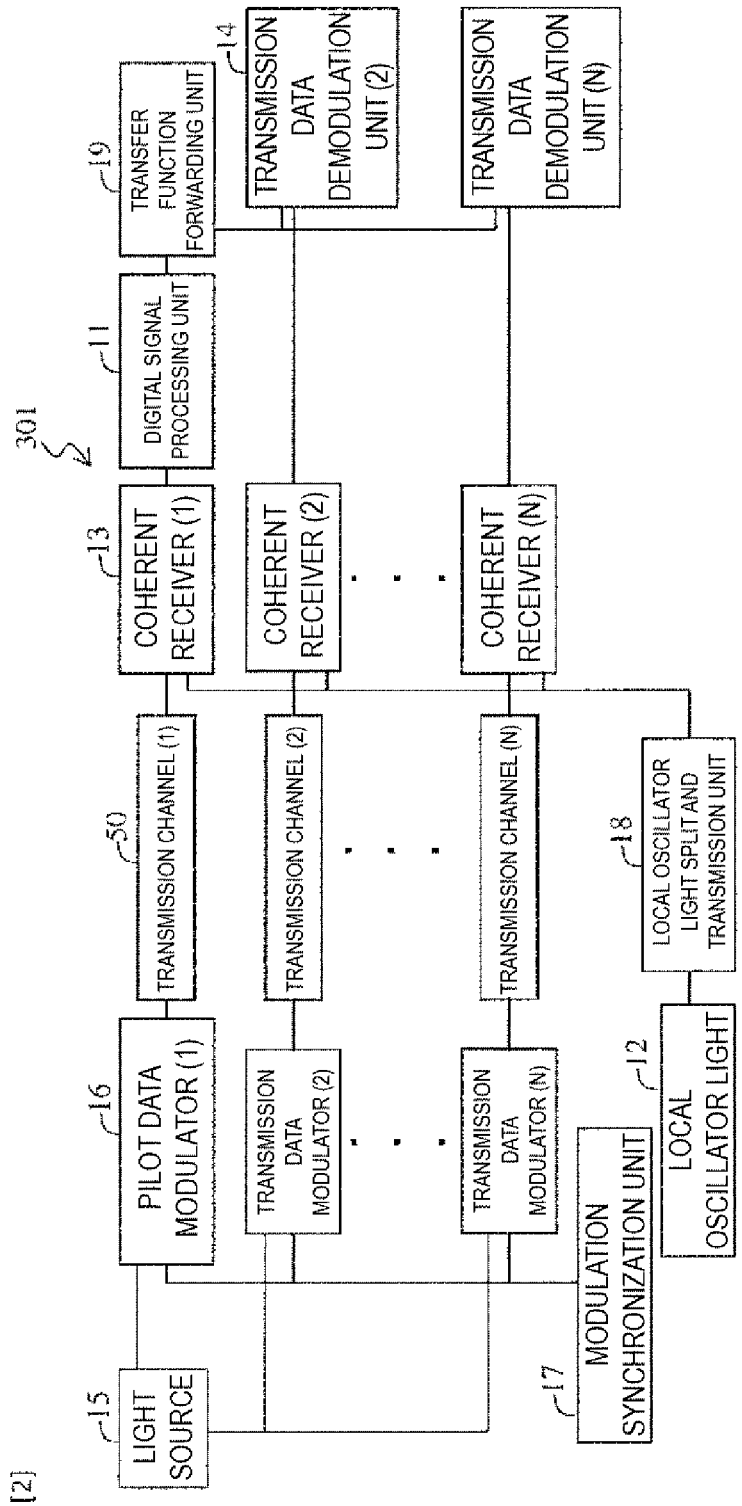
FIG. 2 is a block diagram for describing an optical communication system according to the present invention.

FIG. 2 is a block diagram for describing an optical communication system 301 according to the present embodiment. The optical communication system 301 is an optical communication system that performs digital coherent transmission, the optical communication system including N (N is an integer of 2 or greater) transmission channels 50 that transmit optical signals obtained by modulating light beams with pieces of transmission data, N receivers 13 that are connected to the N transmission channels 50 in a one-to-one manner and receive the optical signals transmitted through the corresponding N transmission channels 50 by performing coherent detection with the same local oscillator light 12, a digital signal processing unit 11 that is connected to a coherent receiver 13 (1) connected to a shortest transmission channel 50 (1), which is a transmission channel with a shortest transmission delay time among the N transmission channels 50, and acquires a transfer function for removing signal distortion of the optical signal propagated through the shortest transmission channel 50 (1), and N−1 transmission data demodulation units 14 (2) to (N) that are connected, in a one-to-one manner, to coherent receivers 13 (2) to (N) connected, in a one-to-one manner, to the other transmission channels 50 (2) to (N), remove signal distortions of the optical signals each propagated through the corresponding other transmission channels 50 (2) to (N) by using the transfer function, and demodulate the pieces of transmission data.

The optical communication system 301 further includes a single light source 15 and N modulators 16 that output optical signals obtained by modulating light beams output by the light source 15 at the same time with the corresponding pieces of transmission data. In digital coherent transmission, transfer functions vary depending on a frequency fluctuation and phase noise of the light source that generates signals. Thus, in order to divert a transfer function identified with the pilot data to demodulation of the transmission data, light generated by the light source 15 at the same time is preferably used for the pilot data signal and the transmission data signal.

A modulation synchronization unit 17 synchronizes operations of the modulator 16 (1) that generates an optical signal of the pilot data and the modulators 16 (2) to (N) that generate optical signals of transmission data. The optical signal modulated by the modulator 16 (1) is transmitted to the transmission channel 50 (1), and the optical signals modulated by the modulators 16 (2) to (N) are transmitted to the transmission channels 50 (2) to (N), respectively.

The transmission channel 50 (1) has a delay time, which is the time from incidence of a signal on the transmission channel to reception of the signal, shorter by s than those of the transmission channels 50 (2) to (N). The optical signal of the pilot data that has propagated through the transmission channel 50 (1) is incident on the receiver 13 (1), and the optical signals of the transmission data that have propagated through the transmission channels 50 (2) to (N) are input to the receivers 13 (2) to (N), respectively.

The local oscillator light used for coherent reception from a local oscillator light source 12 is split into multiple beams by a local oscillator light split and transmission unit 18 and the beams are input to the receivers 13 (1) to (N). The local oscillator light, the optical signal of the pilot data, and the optical signal of the transmission data are combined and coherently received by the receivers 13 (1) to (N).

The pilot data coherently received by the receiver 13 (1) is demodulated in digital signal processing by the digital signal processing unit 11, and a transfer function for demodulation is identified.

Each transmission data coherently received by the receivers 13 (2) to (N) is input to the corresponding demodulation units 14 (2) to (N) for signal demodulation. A transfer function forwarding unit 19 forwards the transfer function identified by the digital signal processing unit 11 to the transmission data demodulation units (2) to (N).

The transmission data demodulation units (2) to (N) compensate for distortion generated in the transmission channels using the transfer function and demodulate the coherently received transmission data.

Note that, although the transmission channel 50 (1) has been described as transmitting only the pilot data in the above description, the transmission channel 50 (1) may transmit transmission data in a manner of following the pilot data. In other words, the optical communication system 301 further includes a demodulation unit 14 (1). Here, the demodulation unit 14 (1) is connected to the shortest transmission channel 50 (1), removes signal distortion of the optical signal propagated through the shortest transmission channel 50 (1) by using the transfer function, and demodulates the data in a manner of following the pilot data.

In the optical communication system of the present embodiment, a transmission delay time difference is made between the optical signal of the pilot data and the optical signal of the transmission data, and thus, even if the transmission times of these optical signals are the same, the demodulation times are different. For this reason, the phase of the local oscillator light used in the coherent reception may be different between when the optical signal of the pilot data is received and when the optical signals of the transmission data are received. If the phase of the local oscillator light is different and the transfer function acquired with the pilot data is diverted to demodulation of the transmission data, demodulation accuracy deteriorates due to phase noise caused by the phase mismatch.

Figure 3:
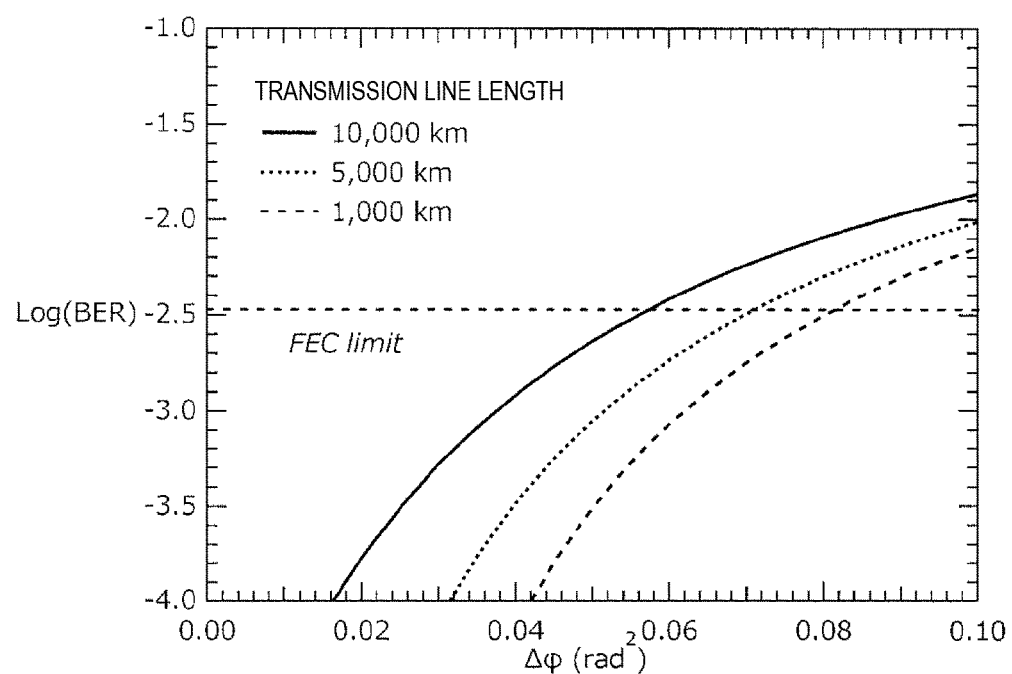
FIG. 3 is a graph for explaining the relationship between a phase fluctuation and a code error rate when the optical communication system according to the present invention employs QPSK. where the horizontal axis represents the phase fluctuation and the vertical axis represents the code error rate.

A maximum optical signal to noise ratio (OSNR) when the transmission method of the optical communication system is QPSK and the loss of the transmission channel is 0.16 dB/km is assumed. FIG. 3 is a diagram illustrating a relationship between a bit error rate (BER) and phase noise $\Delta\varphi$ in the assumption for each transmission line length. Here, the maximum OSNR was calculated based on Non Patent Literature 2, and the BER characteristics of QPSK were obtained according to the following equation based on Non Patent Literature 3.

[Math. 1]

$$BER = \int_{-\pi}^{\pi} \frac{1}{4}\left(\text{erfc}\left(\sqrt{\frac{4}{5}OSNR}\sin\left(\frac{\pi}{4}-\Delta\theta\right)\right) + \text{erfc}\left(\sqrt{\frac{4}{5}OSNR}\sin\left(\frac{\pi}{4}-\Delta\theta\right)\right)\right) \quad (1)$$
$$G(\Delta\theta, \Delta\phi d\Delta\theta$$

Here, G ($\Delta\theta$, $\Delta\varphi$) is a normal distribution in which dispersion is phase noise $\Delta\varphi$.

The error correction limit (FEC limit) when Reed-Solomon with a redundancy of 7% (255, 233) is used in error correction of digital signal processing is a BER equal to $3.4\times10^{-3}$ (for example, see Non Patent Literature 4). The allowable phase noise satisfying the BER that is less than or equal to the error correction limit has values of 0.057 $rad^2$, 0.071 $rad^2$, and 0.081 $rad^2$ when the transmission line lengths are 10000 km, 5000 km, 1000 km, respectively. The above variation in allowable phase noise is due to the deterioration of the OSNR caused by the increase of the transmission line length.

If a transmission delay time difference between the optical signal of the transmission data and the optical signal of the pilot data is set to s and the light source line width is set to $\Delta f$, the phase noise can be expressed as follows according to Non Patent Literature 5.

$$\Delta\varphi = 2\pi\Delta f s \quad [\text{Math. 2}]$$

Figure 4:
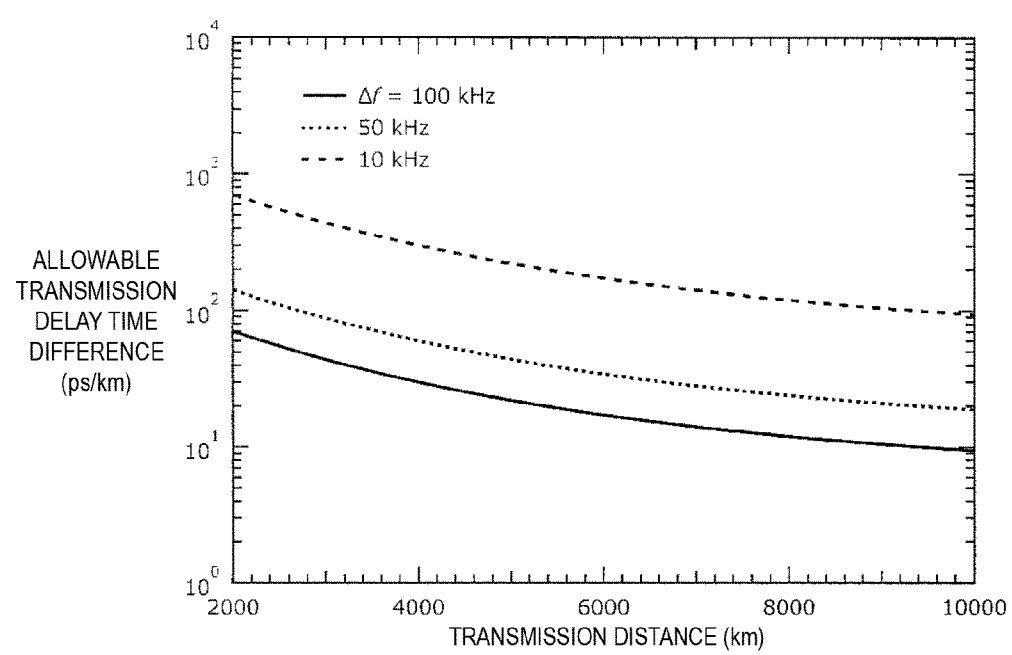
FIG. 4 is a graph for explaining a characteristic diagram of the optical communication system according to the present invention. In the characteristic diagram, the horizontal axis represents a transmission distance, and the vertical axis represents an allowable transmission delay time difference between pilot data and transmission data that achieves a code error rate of an error correction limit, in which the relationship between the transmission distance and the allowable transmission delay time difference is expressed for each light source line width.

FIG. 4 is a diagram illustrating a relationship between an allowable transmission delay time difference s obtained using the equation 2 from allowable phase noise and a transmission distance when a BER, which is the error correction limit, is equal to $3.4\times10^{-3}$ for each light source line width. The allowable transmission delay time difference s degrades because the OSNR deteriorates and the allowable phase noise degrades as the transmission distance increases. In FIG. 4, for example, in a case in which the light source line width is 10 kHz or higher and the transmission distance is 10000 km or less, if the transmission delay time difference between the transmission channels transmitting the pilot data and the transmission data is 100 ps/km or less, signal degradation associated with the demodulation time difference can be curbed.

Third Embodiment

In the first embodiment, the optical communication system that achieves both reduction in load of signal processing and reduction in delay time associated with signal processing has been described, and further, the changing quality of demodulation depending on the relationship between the transmission delay time difference and the transmission distance, and the like have been described.

Figure 5:
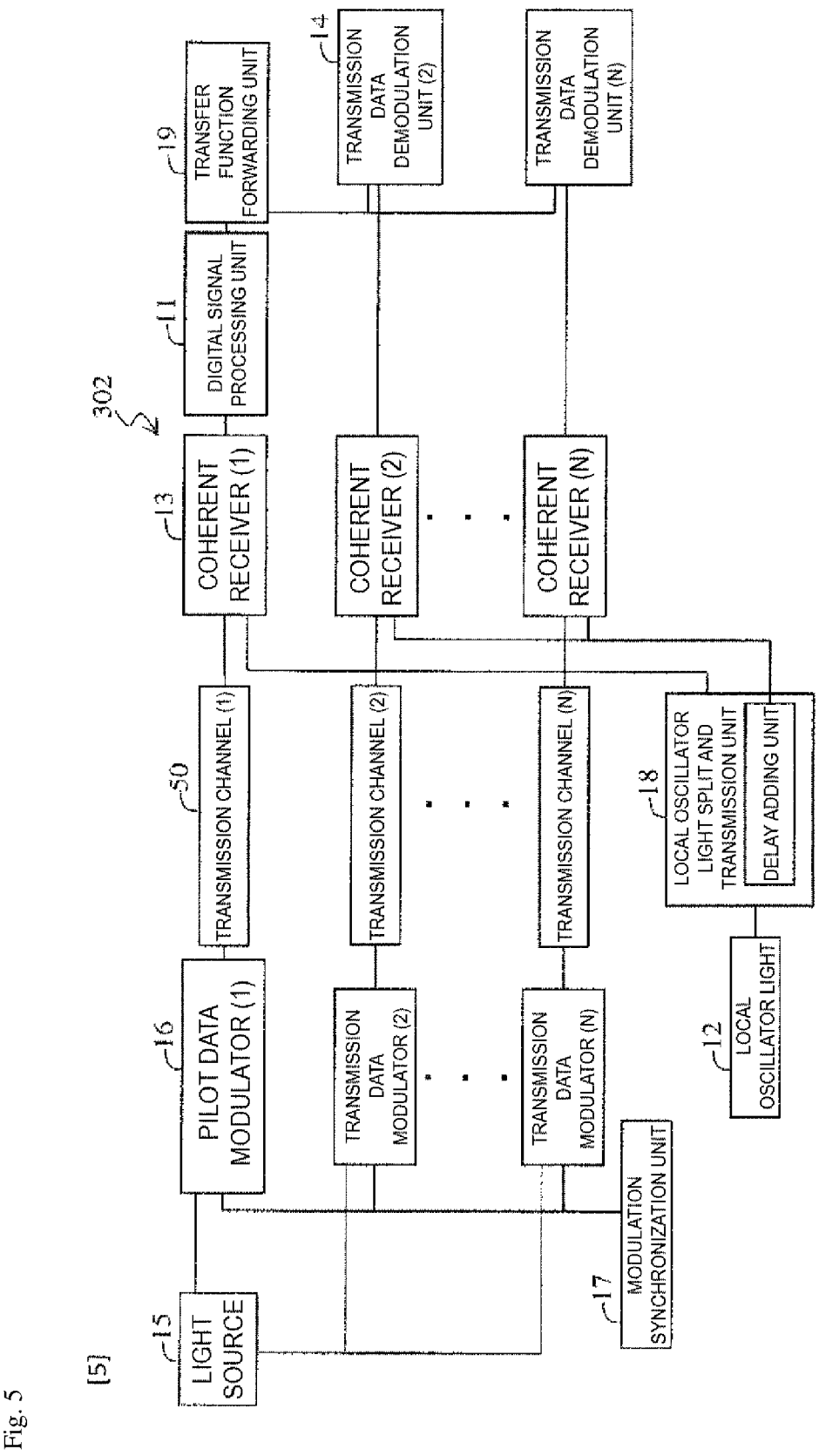
FIG. 5 is a block diagram for describing an optical communication system according to the present invention.

In the present embodiment, an optical communication system in a configuration that prevents change in quality of demodulation due to a relationship between a transmission delay time difference and a transmission distance, and the like, by adding a delay line to the local oscillator light transmission line will be described. FIG. 5 is a diagram for describing an optical communication system 302 according to the present embodiment. The optical communication system 302 further includes a delayer that causes times at which the local oscillator light beams output at the same time arrive at the N receivers to delay by the transmission delay time difference of the transmission channels in the optical communication system 301 illustrated in FIG. 2.

Similar to the optical communication system 301, in the optical communication system 302, a light sources generated by the light source 15 at the same time are used for an optical signal of pilot data and an optical signal of transmission data, and a transfer function is acquired from the optical signal of the pilot data and is diverted to demodulation of the transmission data.

The modulation synchronization unit 17 synchronizes operations of the modulator 16 (1) that generates an optical signal of the pilot data and the modulators 16 (2) to (N) that generate optical signals of transmission data. The optical signal of the pilot data modulated by the modulator 16 (1) is transmitted through the transmission channel 50 (1), and the optical signals of the transmission data modulated by the modulators 16 (2) to (N) are transmitted through the transmission channels 50 (2) to (N), respectively. The optical signal of the pilot data transmitted through the transmission channel 50 (1) is input to the receiver 13 (1), and the optical signals of the transmission data transmitted by the transmission channels 50 (2) to (N) are input to the receivers 13 (2) to (N), respectively.

At this time, the transmission channel 50 (1) and the transmission channels 50 (2) to (N) have different group delay time characteristics, and the optical signal of the pilot data is received by the receiver 13 (1) earlier by the transmission delay time difference s as compared to the optical signal of the transmission data.

Local oscillator light emitted from the local oscillator light source 12 is incident on the local oscillator light split and transmission unit 18. The local oscillator light split and transmission unit 18 includes a delay adding unit 18a that adds a propagation delay time equal to the transmission delay time difference s. The local oscillator light used for coherent reception of the optical signal of the transmission data is incident on the receivers 13 (2) to (N) via the delay adding unit 18a. On the other hand, the local oscillator light used for coherent reception of the optical signal of the pilot data is incident on the receiver 13 (1) without passing through the delay adding unit 18a.

The receiver 13 (1) performs coherent reception by combining the optical signal of the pilot data and the local oscillator light. The digital signal processing unit 11 identifies a transfer function to be used for demodulation. The transfer function forwarding unit 19 forwards the transfer function identified by the digital signal processing unit 11 to the transmission data demodulation units (2) to (N).

The receivers 13 (2) to (N) combine the optical signal of the transmission data and the delayed local oscillator light to coherently receive the signal and transmits the received signal to the transmission data demodulation units (2) to (N). The transmission data demodulation units (2) to (N) demodulate the transmission data from the received signal using a transfer function from the transfer function forwarding unit 19.

Because the local oscillator light incident on the receivers 13 (2) to (N) of the optical signal of the transmission data has passed through the delay adding unit 18a, the difference between the phase of the local oscillator light with respect to the optical signal of the pilot data and the phase of the local oscillator light with respect to the optical signal of the transmission data is sufficiently small. Thus, deterioration in modulation accuracy due to the transmission delay time difference between the optical signal of the pilot data and the optical signal of the transmission data described in the first embodiment can be curbed.

Other Embodiments

A transmission delay time difference between an optical signal of pilot data and an optical signal of transmission data is considered to vary depending on a temperature variation in an optical fiber installation environment. Here, it is known that, in transmission using a multi-core optical fiber (MCF), a temperature variation of a transmission delay time difference of each core is small compared to multiple channel transmission using single-core optical fibers (for example, see Non Patent Literature 6).

For this reason, as the above-described transmission channels, each core of MCFs having two or more types of cores with different group delay time characteristics of light is used. By configuring each core of the MCFs as a transmission channel, environmental fluctuations experienced by each transmission channel become common, and deterioration of modulation accuracy due to the environmental fluctuations can be curbed.

INDUSTRIAL APPLICABILITY

The present invention can be used in coherent optical communications.

REFERENCE SIGNS LIST

11 Signal processing unit
12 Local oscillator light source
13 Receiver
14 Demodulation unit
15 Light source
16 Modulator
17 Modulation synchronization unit
18 Local oscillator light split and transmission unit
18a Delay adding unit
19 Transfer function forwarding unit
50 Transmission channel
301, 302 Optical communication system

The invention claimed is:

1. An optical communication system configured to perform digital coherent transmission, the optical communication system comprising:
N (N is an integer of 2 or greater) transmission channels configured to transmit optical signals obtained by modulating light beams with pieces of transmission data;
N receivers connected to the N transmission channels in a one-to-one manner and configured to receive the optical signals transmitted through the corresponding N transmission channels by performing coherent detection with single local oscillator light beam;
a signal processing unit connected to a receiver of the N receivers connected to a shortest transmission channel and configured to acquire a transfer function for removing signal distortion of an optical signal of the optical signals propagated through the shortest transmission channel, the shortest transmission channel being a transmission channel with a shortest transmission delay time among the N transmission channels; and
N−1 demodulation units connected, in a one-to-one manner, to receivers of the N receivers connected, in a one-to-one manner, to other transmission channels which are other than the shortest transmission channel among the N transmission channels and configured to remove signal distortions of optical signals propagated through the corresponding other transmission channels by using the transfer function and demodulate the pieces of transmission data.

2. The optical communication system according to claim 1,
wherein transmission data of the pieces of transmission data of the optical signal propagated through the shortest transmission channel is pilot data with a shorter transmission delay time which is shorter than any transmission delay times of transmission data among the pieces of transmission data of the optical signals propagated through the other transmission channels.

3. The optical communication system according to claim 1, further comprising:
a single light source; and
N modulators configured to output optical signals obtained by modulating light beams output by the light source at an identical time with the corresponding pieces of transmission data.

4. The optical communication system according to any one of claim 1, further comprising:
a delayer configured to delay times when the local oscillator light beams output at an identical time arrive at the corresponding N receivers by a transmission delay time difference of the N transmission channels.

5. The optical communication system according to claim 2, further comprising:
a second demodulation unit connected to the shortest transmission channel and configured to remove the signal distortion of the optical signal propagated through the shortest transmission channel by using the transfer function and demodulate data following the pilot data.

6. An optical communication method for digital coherent transmission, the optical communication method comprising:
transmitting optical signals through N (N is an integer of 2 or greater) transmission channels;
receiving, with N receivers, the optical signals transmitted through the corresponding N transmission channels by performing coherent detection with single local oscillator light beam;
acquiring a transfer function for removing signal distortion of an optical signal of the optical signals propagated through a shortest transmission channel, the shortest transmission channel being a transmission channel with a shortest transmission delay time among the N transmission channels; and
removing signal distortions of optical signals propagated through other transmission channels other than the shortest transmission channel among the N transmission channels by using the transfer function.

7. The optical communication method according to claim 6,
wherein the optical signal propagated through the shortest transmission channel is modulated with pilot data with a shorter transmission delay time which is shorter than any transmission delay times of transmission data that modulate optical signals propagating through the other transmission channels.

8. The optical communication method according to claim 6,
wherein times when the local oscillator light beams output at an identical time arrive at the corresponding N receivers are delayed by a transmission delay time difference of the N transmission channels.

\* \* \* \* \*